B. W. DALRYMPLE.
CONVEYER SLAT SPLICE.
APPLICATION FILED JULY 2, 1919.
1,383,451.
Patented July 5, 1921.
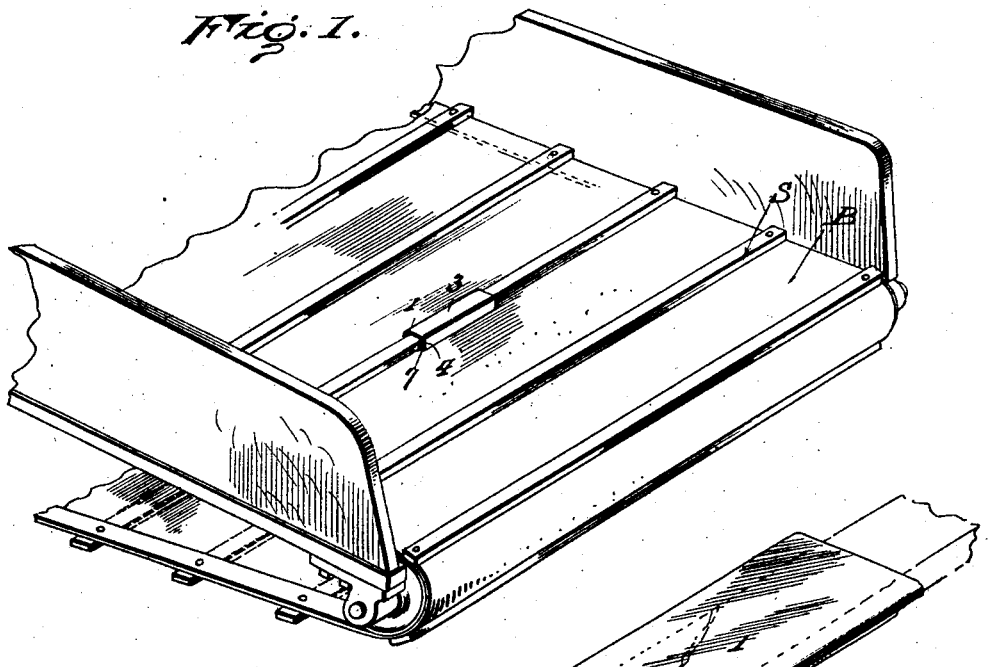
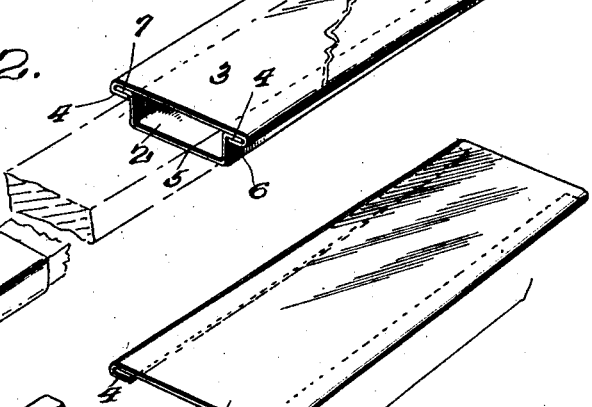
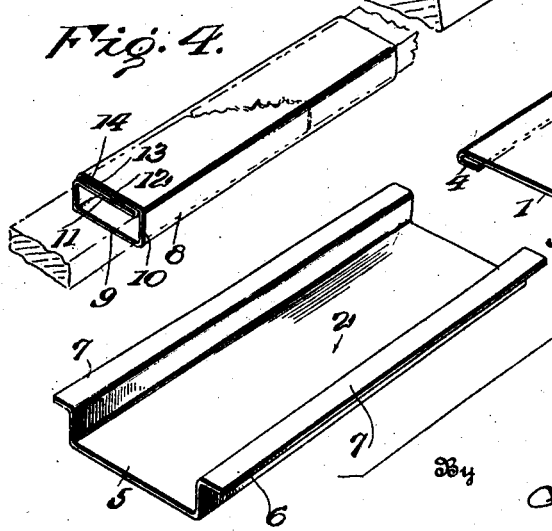
Inventor
BURTON W. DALRYMPLE
By Lacey & Lacey, Attorneys

UNITED STATES PATENT OFFICE.

BURTON W. DALRYMPLE, OF GLASCO, KANSAS.

CONVEYER-SLAT SPLICE.

1,383,451.  Specification of Letters Patent.  Patented July 5, 1921.

Application filed July 2, 1919. Serial No. 308,086.

*To all whom it may concern:*

Be it known that I, BURTON W. DALRYMPLE, a citizen of the United States, residing at Glasco, in the county of Cloud and State of Kansas, have invented certain new and useful Improvements in Conveyer-Slat Splices, of which the following is a specification.

This invention relates to splicing devices for use in repairing broken or fractured slats upon harvester and other conveyer belts and has as its object to provide a splicing device which may be readily applied to any ordinary slat and which will effectually cover the break or fracture and brace the slat as rigidly as though it had not been damaged, thus obviating the necessity of completely removing the slat and replacing the same with a new one.

A further object of the invention is to so construct the splicing device that the same may be applied to the slat without the necessity of disturbing any of the rivets or other fastening elements which serve to secure the slat to the conveyer belt.

The invention further has as its object to provide a splice for the purpose stated which may be manufactured from sheet metal at a low cost and readily applied without the use of tools.

In the accompanying drawings:

Figure 1 is a perspective view illustrating one of the splices applied to a fractured or broken slat of the conveyer belt;

Fig. 2 is a perspective view of the splice shown in Fig. 1, the broken or fractured slat being shown in dotted lines and the members of the splice being assembled;

Fig. 3 is a group perspective view illustrating the two members of the splice disassembled;

Fig. 4 is a view similar to Fig. 2 illustrating a modification of the invention.

In the drawings the reference letter B indicates a conveyer belt which may form a part of the conveyer of a harvester or other agricultural machine, or which may be the belt of any other type of conveyer, and the reference letter S indicates the usual wooden slats which are secured upon the outer surface of the belt. As is well-known these slats being more or less frail, are liable to fracture especially at their intermediate portions, and ordinarily when this occurs the broken or fractured slat is removed and a new slat is substituted therefor. This requires not only the cutting of the rivets or removal of other types of fastening elements provided for securing the original slat in place upon the belt but also requires the purchase or making of a new slat and the provision of means for securing the same in place upon the belt. As stated above, the object of the present invention is to provide a splicing device which may be applied to a broken slat without disturbance of the fastening elements for securing the slat in place upon the belt and which will rigidly brace the slat at the fracture so that the slat as a whole will possess the same rigidity as originally.

In that form of the invention shown in Figs. 1, 2 and 3 of the drawings, the splicing device embodying the present invention comprises two members which are so constructed as to adapt them to be slid together in locking engagement with each other and in a manner to surround the fractured portion of the slat to which they are applied, and these members are indicated in general, one by the reference numeral 1 and the other by the reference numeral 2. Both members are formed from sheet metal and the member 1 comprises a plate 3 which is flat and of substantially oblong rectangular form and which has its lateral edge portions folded inwardly to provide flanges 4 which lie in spaced parallel relation to the upper face of the plate 3 and which, of course, extend parallel to each other. The member 2 comprises a plate 5 which also is of oblong rectangular form and the lateral edges of which are bent upwardly at right angles from the body portion to form side flanges 6 which in turn have their edge portions bent outwardly to provide outwardly projecting flanges 7 extending at right angles to the flanges 6. The members 1 and 2 are so relatively proportioned that they may be assembled and locked in assembled relation by disposing the members end to end and sliding the flanges 7 of the member 2 beneath the flanges 4 of the member 1 in the manner clearly shown in Fig. 2 of the drawings. In applying this form of invention to a fractured conveyer slat as illustrated in Fig. 1 of the drawings, the member 2 is slipped into position between the outer surface of the conveyer belt or apron B and the under side of the slat with the fracture in the slat located substantially midway between the ends of the said member 2 and with the flanges 6 lying at the opposite sides of the slat. The member 1 is then disposed above the slat and with one of its ends confronting one end of the member 1. The member 1 is then slid longitudinally of the slat in a manner to engage its flanges 4 beneath the flanges 7 of the member 2, and when the ends of the two members have been brought into registration as shown in Fig. 2, the splicing of the slat is completed by bending down the interlocked flanges 4 and 7 of the two members as shown in Fig. 1 and the slat will be found to be as rigid as before its fracture. It will be understood, of course, that the under face of the plate 3 of the member 1 snugly engages the upper side of the slat and that the plate 5 and flanges 6 of the member 2 respectively snugly engage the under side and edges of the said slat. Thus by the use of the splice just described, the fractured slat may be provided with a splicing sleeve completely surrounding its fracture and yet the application of the sleeve does not in any way necessitate disturbance of the means provided for securing the slat to the conveyer belt.

In that form of the invention shown in Fig. 4 of the drawings, a rectangular sheet metal blank indicated in general by the numeral 8 is employed for the purpose of splicing the slat and this blank is bent or folded to provide a bottom portion 9 which engages the under side of the slat, side walls 10 which engage the edges of the slat and a top wall which engages the upper side of the slat and which is formed by folding the blank inwardly at right angles from one of the side walls 10 to provide a fold 11 which in turn is folded back upon itself as at 12, the fold 12 being received between folds 13 and 14 formed by longitudinally folding the portion of the blank which extends from the other side wall 10. Of course, in this form of the invention the blank will be initially in only semi-folded condition so that it may be slipped between the slat and conveyer apron until the walls 9 and 10 embrace the under side and lateral edges of the slat, whereupon the other folds may be completed so as to close the splice about the fractured portion of the slat.

In both forms of the invention the splice is initially in the nature of an open sleeve adapted to be closed about the fractured portion of the slat.

While the invention has herein been illustrated and described chiefly in the nature of a splice for a broken slat, it will be readily understood that the sections comprising the device may be made equal in length to the wooden slats of the conveyer and originally applied to the slats so as to extend the entire length thereof and completely inclose the same. It is preferable that the member 2 be made of relatively thin sheet metal so that nails or other suitable securing elements may be conveniently driven through it and into the wooden slat to which the member and its companion member 1 are applied.

Having thus described the invention, what is claimed as new is:

A slat splice comprising a relatively flat member provided at its longitudinal edges with inwardly directed flanges spaced from the intermediate portion of the member, and a member comprising a flat intermediate portion and upstanding side walls occupying substantially parallel planes, the said side walls being provided at their free longitudinal edges with outwardly laterally directed flanges slidably engageable with the flanges of the first-mentioned member, said flanges being adapted to be bent against said side walls to securely clamp the slat.

In testimony whereof I affix my signature.

BURTON W. DALRYMPLE. [L. S.]